United States Patent [19]

Sardou et al.

[11] Patent Number: 5,143,334

[45] Date of Patent: Sep. 1, 1992

[54] LOW MOVING MASS TWO AXIS GIMBAL

[75] Inventors: Freeman D. Sardou, Fullerton; Robert S. Chandler, Jr., Phillips Ranch, both of Calif.

[73] Assignee: Rockwell International Corporation, Seal Beach, Calif.

[21] Appl. No.: 703,645

[22] Filed: May 21, 1990

[51] Int. Cl.[5] ............................................. F16M 11/12
[52] U.S. Cl. ..................................................... 248/184
[58] Field of Search ............... 248/178, 179, 180, 184, 248/185; 74/5.47; 901/28

[56] References Cited

U.S. PATENT DOCUMENTS

| | | | |
|---|---|---|---|
| 3,267,745 | 8/1966 | Smead et al. | 74/5.47 X |
| 4,088,031 | 5/1978 | Sholes . | |
| 4,158,312 | 6/1979 | Fabian et al. . | |
| 4,300,362 | 11/1981 | Lande et al. | 901/28 X |
| 4,318,522 | 3/1982 | Appleberry . | |
| 4,382,709 | 5/1983 | Brown . | |
| 4,403,838 | 9/1983 | Beilock et al. . | |
| 4,419,983 | 12/1983 | Schmidt . | |
| 4,798,949 | 1/1989 | Wilcox et al. . | |
| 4,862,739 | 9/1989 | Dobbs . | |
| 4,919,382 | 4/1990 | Forman | 248/178 |
| 4,951,521 | 8/1990 | Jacobson | 248/184 |

Primary Examiner—Alvin C. Chin-Shue
Attorney, Agent, or Firm—H. Fredrick Hamann; George A. Montanye; Tom Streeter

[57] ABSTRACT

The low moving mass two axis gimbal shown here has a drive gimbal 10 and a payload gimbal 12 on a common central post 14. Each gimbal 10,12 has two axes 16,18,20,22. The rings 24,26 of the gimbals 12,14 are kept parallel to each other by three push rods 28,30,32, which are parallel to the post 14 and are joined to the rings 24,26 by universal joints 34,36,38,40,42,44. The distance between corresponding pivot points (46 and 52,48 and 54, and 50 and 56) is the same, and equals the distance from drive gimbal pivot 58 to payload gimbal pivot 60. In the drive gimbal 10, an X-axis motor 62 mounted on the central post 14 drives the X-axis 16, and a Y-axis motor 64 mounted on the X-axis 16 drives the Y-axis 18. Providing two small gimbal rings 24,26 instead of one large ring reduces the moving mass (rotational inertia) of the device, thereby producing quicker response times. Providing twin rings 24,26 also allow the device to fit within a narrower (although longer) volume than providing a single ring would.

4 Claims, 1 Drawing Sheet

LOW MOVING MASS TWO AXIS GIMBAL

This invention was made with Government support under Contract No. DASG60-87-C-0031 (Subcontract No. LTV P-3104280) awarded by the Army. The Government has certain rights in this invention.

BACKGROUND OF THE INVENTION

The present invention relates to gimbals and has particular relation to two axis gimbals with a low moving mass (rotational inertia).

A tactical missile has a fairly small diameter, but must have a movable antenna at its nose to operate the radar, laser, or other sensing apparatus by which the missile steers itself. Any powered gimbal sufficiently powerful as to quickly rotate the antenna to the desired position will have a motor or motors so large as to consume an unacceptablly large portion of the cross section of the moving area, thereby leaving an inadequate area for the antenna itself, direction sensors, gyros, etc.

SUMMARY OF THE INVENTION

It is an objective of the present invention to overcome these limitations by providing two gimbals; a forward, payload gimbal and an aft, drive gimbal.

It is a feature of the present invention that each of the gimbals is narrower than a single gimbal would have been.

It is an advantage of the present invention that it may fit into a narrower, albeit longer, volume than a single gimbal.

It is a further advantage of the present invention that the combined rotation inertia of the twin gimbals is less than that of a single, larger gimbal.

It is a further advantage of the present invention that the center of mass of the twin gimbal system is aft of the center of mass of a single gimbal system, thereby reducing the rotational inertia of the missile as a whole, making the missile as a whole more maneuverable.

DETAILED DESCRIPTION OF A PREFERRED EMBODIMENT

Figure 1:
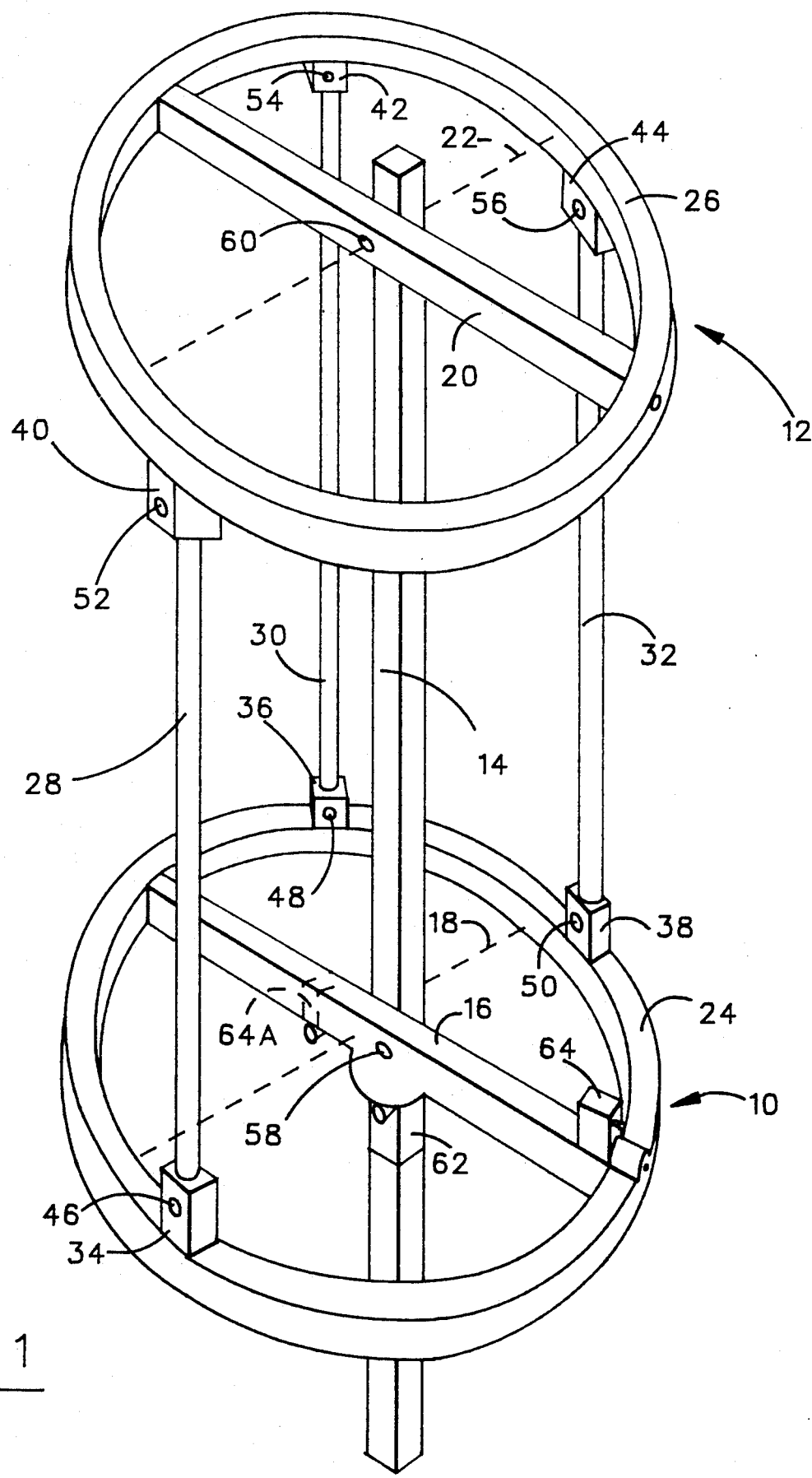
FIG. 1 shows a partially schematic perspective view of the present invention.

A drive gimbal 10 and a payload gimbal 12 are mounted on a common central post 14. The drive gimbal has an X-axis 16 and a Y-axis 18, while the payload gimbal has an X-axis 20 and a Y-axis 22. The X-axis 16 of the drive gimbal supports a drive ring 24, while the X-axis 20 of the payload gimbal supports a payload ring 26. The rings 24 and 26 are kept parallel to each other, or at least maintain a fixed angular displacement with respect to each other, by three push rods 28, 30, and 32. This displacement may take any desired value. The push rods 28, 30, and 32 lie parallel to the post 14.

If desired, the push rods 28, 30 and 32 may be replaced with cables or other apparatus for keeping the rings 24 and 26 parallel, and the term "push rod" should be construed accordingly. This is not preferred, since flexing of the cables changes their lengths, and it is important that the push rods 28, 30, and 32 (or their equivalents) maintain lengths equal to one another.

Push rod 28 has a drive end which is attached to the drive gimbal ring 24 by a drive universal joint 34. Similar drive universal joints 36 and 38 attach, respectively, the drive end of push rods 30 and 32 to the drive ring 24.

Push rod 28 has a payload end which is attached to the payload ring 26 by a payload universal joint 40. Similar payload universal joints 42 and 44 attach, respectively, the payload ends of push rods 30 and 32 to the payload ring 26. A conventional "double-U" universal joint is preferred, but a ball-in-socket universal joint or other double axis joint may be used if desired, especially when the range of motion of the gimbal is small.

Universal joints 34, 36, 38, 40, 42, and 44 have, respectively, pivot points 46, 48, 50, 52, 54, and 56.

As noted above, it is important that the length of the push rods 28, 30, and 32 be equal to one another. More precisely, the distance from pivot point 46 to pivot point 52 must equal that between pivot points 48 and 54, and pivot points 50 and 56. It is also important that this common distance equal the distance from the pivot 58 of the drive gimbal 10 to the pivot 60 of the payload gimbal 12. As shown in FIG. 1, it is not necessary that the drive pivot 58 lie in the plane defined by the drive universal joint pivot points 46, 48, and 50; nor is it necessary that the payload pivot 60 lie in the plane defined by the payload universal joint pivot points 52, 54, and 56. Such coplanarity may be provided if desired.

In the drive gimbal 10, an X-axis motor 62 is mounted on the center post 14, and drives the X-axis 16. A Y-axis motor 64 is mounted on the X-axis 16, and drives the Y-axis 18. This driving of the Y-axis may be done by mounting the Y-axis motor 64 at an end of the X-axis, and driving the drive ring 24 directly, or the Y-axis motor 64 may be mounted close to the pivot point 58, shown as Y-axis motor 64A, and drive the Y-axis 18, which, in turn, drives the drive ring 24.

Operation is apparent from the foregoing description. Operating the X-axis motor 62 rotates the X-axis 16, which rotates the drive ring 24, which rotates the payload ring 26 through the push rods 28, 30, and 32. Since the rotation is of the drive X-axis 16 and the payload X-axis 20, this rotation will be about the drive Y-axis 18 and payload Y-axis 22. Similarly, operating the Y-axis motor 64 directly rotates the drive ring 24. If the Y-axis motor 64 is located at its alternative location, then it is referred to as drive motor 64A, and will rotate the drive Y-axis 18. With respect to drive motor 64, the Y-axis 18 is imaginary; with respect to drive motor 64A it is real. In either event, the drive ring 24 is rotated about the X-axis 16, thereby moving the push rods 28, 30, and 32, and rotating the payload ring 26 about the X-axis 20. As with the drive gimbal 10, the payload gimbal 12 may have a Y-axis 22 which is either real or imaginary. If real, the connection of the X-axis 20 to the payload ring 26 may be omitted, or it may be retained for additional stability. The same is, or course, true of drive X-axis 16 with respect to drive ring 24.

The common central post 14 is shown as a conventional post. Inspection will reveal, however, that any apparatus which maintains the drive pivot 58 and the payload pivot 60 in their respective positions and orientations will serve as a "central post" 14, and the phrase "central post" should be construed accordingly. Similarly, while three push rods are preferred, more may be provided if desired, and it is strictly speaking necessary only to have two push rods, provided that they are not diametrically opposed to each other. Further, the drive ring 24 need not be a literal ring, as shown, but need only be apparatus sufficient to maintain the point of attachment of the X-axis 16 to the ring 24 in some fixed relationship to the drive pivot points 46, 48, and 50 (or just 46 and 48, if there are only two push rods 28 and 30). The same is true of the payload ring 26 and payload universal joint pivots 52, 54, and 56.

The decision to use an external Y-axis motor 64 or an internal Y-axis motor 64A is a design choice. An external motor 64 has a greater distance from the pivot point 58, and therefore has a larger rotational inertia. An internal motor 64A has less rotational inertia, but this may be partially or completely offset by the presence of the real Y-axis 18, which will provide both additional mass and additional rotational inertia. The same considerations apply in determining whether to make the payload Y-axis 22 real or imaginary.

In either event, providing two small gimbal rings 24 and 26 instead of one large ring reduces the moving mass (rotational inertia) of the device, since the average distance of both the rings and the apparatus on the rings to the central post 14 is smaller on a twin ring system than on a single ring system. This reduced rotational inertia provides quicker response times. Further, the reduced diameter of the rings allows the apparatus to be fit into a narrower volume than a single ring apparatus could be, although the volume will be longer. It a tactical missile, narrowness is generally more important than shortness. Finally, the motors 62 and 64 (or 64A) are generally the heaviest elements of the radar steering apparatus. Moving them aft, to the drive gimbal, also moves them closer to the center of mass of the missile itself. This has the further desirable effect of reducing the rotational inertia of the missile as a whole, making the missile as a whole more maneuverable.

INDUSTRIAL APPLICABILITY

The present invention is capable of exploitation in industry, and can be used, whenever it is desired to have a two-axis gimbal system which is narrow, of low rotational inertia, or with the center of mass considerably to the aft, or any combination thereof. It is capable of being made from individual components which, considered separately and apart from one another, are entirely conventional, or it may be made out of nonconventional counterparts of such components.

While a preferred embodiment of the present invention has been described and shown, the true spirit and scope of the invention is not restricted thereto, but is limited only by the following claims.

What is claimed is:

1. A machine comprising:
(a) a drive gimbal having a drive ring, an axis, and a support;
(b) a payload gimbal having a payload ring;
(c) a plurality of push rods, each push rod having a drive end and a payload end, the drive end being attached to the drive gimbal ring by a drive universal joint, and the payload end being attached to the payload gimbal ring by a payload universal joint;
(d) a first motor mounted on the support and connected for rotating the axis with respect to the support;
(e) a second motor mounted on the axis and connected for rotating the drive ring with respect to the axis.

2. The machine of claim 1, wherein the plurality of push rods is three.

3. The machine of claim 1, wherein:
(a) the axis is a first axis;
(b) the drive gimbal further comprises a second axis mounted between the first axis and the drive ring; and
(c) the second motor is connected for rotating the drive ring by being connected for rotating the second axis.

4. The machine of claim 3, wherein the plurality of push rods is three.

* * * * *